(12) United States Patent
Carstens et al.

(10) Patent No.: US 7,914,749 B2
(45) Date of Patent: Mar. 29, 2011

(54) CLATHRATE HYDRATE MODULAR STORAGE, APPLICATIONS AND UTILIZATION PROCESSES

(75) Inventors: Christopher Carstens, Menlo Park, CA (US); Wade Dickinson, San Francisco, CA (US); Wayne Dickinson, San Rafael, CA (US); Jon Myers, San Rafael, CA (US)

(73) Assignee: Solid Gas Technologies, San Rafael, CA (US)

( * ) Notice: Subject to any disclaimer, the term of this patent is extended or adjusted under 35 U.S.C. 154(b) by 1161 days.

(21) Appl. No.: 11/475,556

(22) Filed: Jun. 27, 2006

(65) Prior Publication Data

US 2007/0100178 A1 May 3, 2007

Related U.S. Application Data

(60) Provisional application No. 60/694,322, filed on Jun. 27, 2005.

(51) Int. Cl.
*C07C 9/00* (2006.01)
(52) U.S. Cl. ............ 422/198; 422/200; 422/201; 585/15
(58) Field of Classification Search .................... 585/15; 422/198, 200–201, 105–116; 62/532
See application file for complete search history.

(56) References Cited

U.S. PATENT DOCUMENTS

| | | | | |
|---|---|---|---|---|
| 3,505,211 A | * | 4/1970 | Gebhart, Jr. et al. | 585/15 |
| 5,536,893 A | | 7/1996 | Gudmundsson | |
| 5,613,362 A | | 3/1997 | Dixon | |
| 5,851,068 A | * | 12/1998 | Rumph | 366/348 |
| 6,389,820 B1 | | 5/2002 | Rogers | |
| 6,602,326 B2 | * | 8/2003 | Lee et al. | 95/153 |
| 6,634,183 B1 | * | 10/2003 | Jonsson et al. | 62/476 |
| 2001/0052288 A1 | | 12/2001 | Lee et al. | |
| 2002/0083720 A1 | | 7/2002 | Takao et al. | |
| 2002/0155047 A1 | | 10/2002 | Max | |
| 2002/0189277 A1 | | 12/2002 | Takao et al. | |
| 2003/0209492 A1 | * | 11/2003 | Max | 210/638 |

OTHER PUBLICATIONS

Notification of Transmittal of the International Search Report and the Written Opinion of the International Searching Authority, PCT Application No. PCT/US06/24850, mailed Aug. 23, 2007.

* cited by examiner

*Primary Examiner* — Walter D Griffin
*Assistant Examiner* — Brian McCaig
(74) *Attorney, Agent, or Firm* — Baker Botts L.L.P.

(57) ABSTRACT

Methods, apparatuses and systems directed to clathrate hydrate modular storage, applications and utilization processes. In one implementation, the present invention provides a method of creating scalable, easily deployable storage of natural gas and thermal energy by assembling an array of interconnecting, modular gas clathrate hydrate storage units.

17 Claims, 10 Drawing Sheets

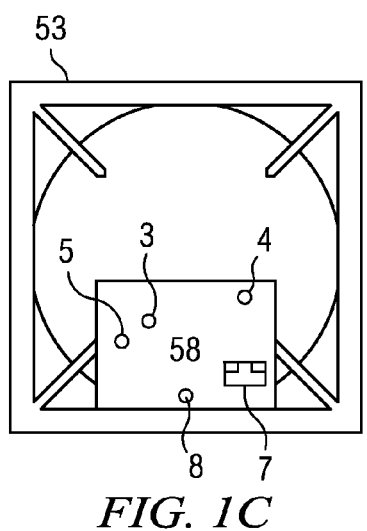
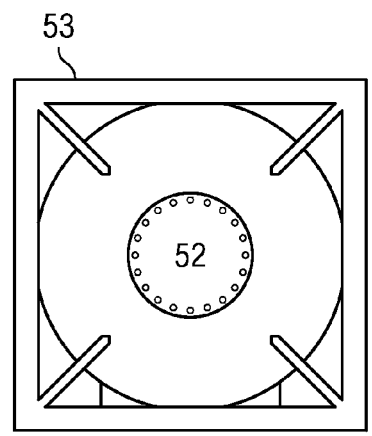
FIG. 1C  FIG. 1D
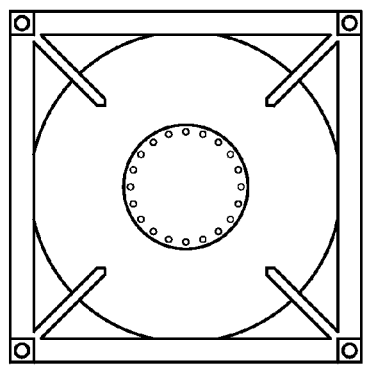
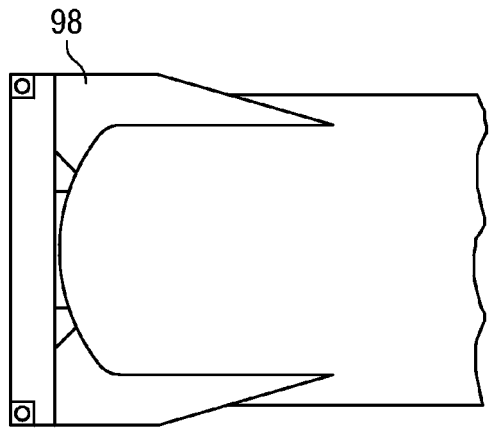
FIG. 1E  FIG. 1F
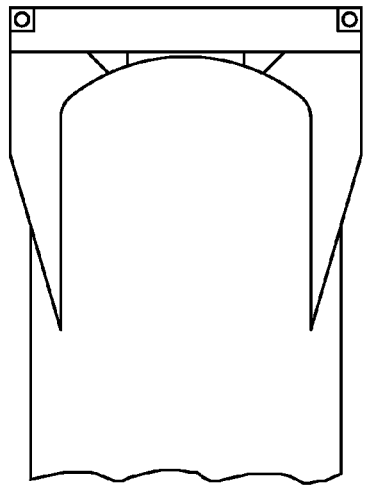
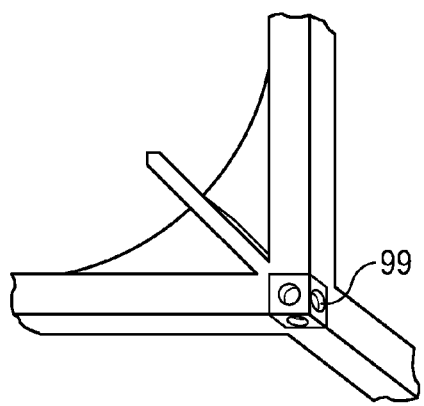
FIG. 1G  FIG. 1H

CLATHRATE HYDRATE MODULAR STORAGE, APPLICATIONS AND UTILIZATION PROCESSES

CROSS-REFERENCE TO RELATED APPLICATION

The present application claims priority to U.S. provisional application Ser. No. 60/694,322 filed Jun. 27, 2005.

FIELD OF THE INVENTION

The present invention relates natural gas and thermal energy storage, and more particularly to scalable, modular clathrate hydrate formation and dissociation systems.

BACKGROUND OF THE INVENTION

Clathrate Physical Chemistry

Clathrate hydrates are crystalline compounds defined by the inclusion of a guest molecule within a hydrogen bonded water lattice. Quantum physical forces such as van der Waals forces and hydrogen bonding are involved in creating and maintaining these clathrate hydrate structures. Gas hydrates are a subset of clathrate hydrates wherein the "guest" molecule is a gas at or near ambient temperatures and pressures. Such gasses include methane, propane, carbon dioxide, hydrogen and many others. Clathrate hydrates are defined by four primary physical characteristics that are of practical engineering interest: an ability to adsorb remarkably large amounts of guest molecules within a hydrogen bonded lattice; an ability to separate gas mixtures based on the preferential formation of one gas hydrate over another; a large latent heat of formation that is similar to that of ice, but dependent on the specific guest molecule and additives; and a formation temperature generally higher than that required to convert water to ice.

The unique physical characteristics of clathrate hydrates described above have led, over the last fifty years, to the proposed application of clathrate hydrates to a number of distinct industrial uses including gas transport, gas storage, thermal energy storage, desalination and gas separation.

Historically, most research has been devoted to prevention of clathrate hydrate formation in gas pipelines. Aside from such prevention focused art, the largest proportion of prior art is focused on devising methods for transportation of natural gas by ship using clathrate hydrates. Much of this prior art has focused on various strategies for continuous production of a gas hydrate. See, for example, U.S. Pat. Nos. 2,356,407, 6,082,234, 6,038,235, 6,180,843, 5,964,093, 6,082,118, 6,653,516, and 6,653,516. Proposed continuous production systems typically contemplate the manufacture of a clathrate hydrate 'slurry' (loosely aggregated or suspended in solution) by mixing a clathrate hydrate forming gas and water at low temperature and high pressure in a manner designed to maximize the surface contact area between the two. Many of these continuous production models contemplate complex, refinery-like processes that require additional large systems for movement and storage of the hydrate product. The requirement for large custom engineered machinery is likely to make these systems prohibitively expensive for moderate to small-scale storage or transport operations.

Some prior art has proposed strategies for production of hydrate in enclosed systems that also store the product for future use. These include U.S. Pat. Nos. 4,920,752, and 5,540,190. Of particular interest is the quiescent hydrate system using surfactants described in U.S. Pat. No. 6,389,820 to Rogers, which is incorporated by reference herein. Rogers demonstrated that the addition of a small amount of the appropriately chosen surfactant could increase the formation rate of gas hydrate by more than 700 times. A rapid formation rate for clathrate hydrate is important for commercial applications. Another advantage of the Rogers demonstration is that the resulting hydrate in this method has very little occluded water. Density of successfully formed clathrate hydrate is important for commercial applications. Further, the Rogers demonstration unit was simple with few moving parts. A simple clathrate hydrate mechanism that avoids complex multi-step processing is of great engineering and commercial interest. However, the system described by Rogers in DOE report DE-AC26-97FT33203 suffers from a number of deficiencies with regard to prospective commercial application. A serious deficiency that has not been addressed is the buildup of gas hydrate on the heat exchanger surfaces, which results in unacceptably low thermal conductivity. A further limitation of the Rogers system is the large amount of thermal energy required for clathrate hydrate formation that is lost upon dissociation of the clathrate hydrate in order to reproduce the guest molecule. Also, the Rogers demonstration system does not address important requirements for a system that directly meets varying commercial needs for cogeneration, cost, mobility, operations management, permanence, safety, scale, serviceability, and thermal preservation and reuse. Finally, the Rogers system is focused on a single surfactant whereas there are many surfactants in the class of surfactant used by Rogers and many more probable formation accelerators now being identified in emerging art.

As briefly detailed above, despite 50 or more years of effort, there have been many constraints to efficient, controlled formation of clathrate hydrates and, ultimately, to commercialization of systems based on clathrate hydrates. Many well-known academic researchers, research institutions, and corporate laboratories throughout the world are focused on further improving the gas clathrate formation process by speeding formation, lowering required pressure, increasing required temperature for hydrate formation. Recently, the pace of research has accelerated with promising results. Recent published and/or patented art has identified and defined new mechanisms and potential mechanisms by which formation of natural gas clathrates can be made significantly more efficient. Such art includes the use of certain formation catalysts such as surfactants, hydrotropes, H-hydrate promoters, and activated carbon, which increase the efficiency of clathrate hydrate formation as well as various approaches to increase the rate of thermal transfer.

Natural Gas Transport

Natural gas is currently transported from gas fields to end users via two primary methods: Gas Pipelines and Liquified Natural Gas (LNG). A more recent proposed development has been the use of Compressed Natural Gas (CNG) for gas transport (U.S. Pat. Nos. 6,584,781 and 5,803,005). Another recently applied method for transporting natural gas has been the conversion of the Gas to Liquids (GTL), such as Methanol, Dimethyl Ether (DME) and Fischer Tropsch Diesel (FT-Diesel). Each of these technologies, Gas Pipelines LNG, CNG and GTL, has advantages and disadvantages.

Discussion of Current Gas Transportation Systems

Gas pipelines transport the majority of the world's natural gas to end users. Pipelines can be the most economic method of transporting large volumes of gas over short to medium distances. However, pipelines as a universal means of moving natural gas are limited by geographic, logistical, political, and territorial constraints. Gas pipelines are costly to construct in open terrain and prohibitively costly to construct in populated regions. Much like the railroads, the U.S. pipeline system evolved over many years having been constructed by many competing interests. As such, today's U.S. pipeline system is far from optimized for efficient delivery of sufficient natural gas to meet demand, particularly at peak demand periods. Further, the profile of gas usage by industry, in particular the dramatic growth of gas-fired turbines for electricity production, has exacerbated the daily fluctuation in demand for natural gas beyond the capability of the pipeline system to meet this demand without extraordinary measures. The result has been increasing frequency of price spikes and a fear among commercial users that highly disruptive allocations of natural gas are inevitable in the near future. Moreover, pipelines are highly vulnerable to attack or disruption by other factors such as aging or earthquakes. They are also limited in their ability to transport gas across deep water because of prohibitive cost of construction, naturally occurring clathrate hydrate formation (which can plug the pipeline) and the difficulty of maintaining such structures.

LNG is formed by cooling natural gas below its boiling point, forming a cryogenic liquid that is approximately 600 times denser than atmospheric natural gas. The cryogenic liquid is then transported on and offloaded from very large marine vessels. LNG is by far the most used method of transporting natural gas where pipelines are not possible such as long distance transoceanic transport. Though economic for very large gas reserves (over 5 trillion cubic feet (TCF)) transported over long ocean distances, LNG has a number of drawbacks that have limited its application for shorter distance transport or for small to medium size gas reserves (under 5 TCF). To date, the complexity and cost of LNG production systems has made LNG unsuitable for transportation of natural gas from offshore production facilities. (Offshore production facilities frequently produce large amounts of gas with the oil where the gas cannot be brought to market and must be re-injected or flared). Further, LNG is considered too expensive to be economic for transportation of natural gas for land-based applications where pipelines are not available or sufficient. A further disadvantage of LNG is its inherent volatility, which makes it a potentially attractive target for terrorists. A recent report by Sandia Laboratories concluded that a maritime attack on an LNG tanker could cause widespread and serious damage and injury within a 2,000-foot radius.

High natural gas prices and the widespread existence of smaller "stranded" (i.e. natural gas produced or produce-able but not able to be brought to and sold to market) gas fields, particularly deep water gas fields where pipelines and LNG are impractical, have led to renewed interest in the use of CNG for transport of natural gas. CNG transport and storage systems rely on the use of extremely high pressures to reduce the volume of natural gas by a factor of roughly 175 to 200 times, depending on the particular system. CNG offers a number of advantages over LNG for short to medium distance gas transport. In particular, CNG eliminates the need for the large, fixed infrastructure required to create LNG. A further advantage of CNG is the elimination of complex and expensive degasification terminals on the receiving end of the supply chain. Yet another advantage of CNG is that the bulk of the investment is in the CNG ships themselves making the CNG production/storage units inherently redeploy-able. This redeploy-able nature of CNG systems could also enable the capture of natural gas from smaller land-based gas fields where LNG is not practical. However, CNG has several significant disadvantages. One disadvantage of CNG systems is the reliance on very strong and heavy steel "bottles" to store the pressurized gas. These bottles are limited in diameter and therefore require large numbers of valves and manifolds to control inflow and outflow of gas. A further, and difficult to overstate, disadvantage is the extreme volatility of natural gas at very high pressure. A small leak or failure has the potential to explosively release very large amounts of energy. Yet another disadvantage of CNG systems is their very high cost per constant capacity for storage compared to LNG ships. Another disadvantage of CNG systems is that the proposed CNG ships would be very heavy and are difficult to dry dock for maintenance. A further disadvantage of CNG is the difficulty associated with inspecting the pressure tanks (for cracks or other safety risks) and replacing them when there is a problem.

Increasing demand for clean burning liquid fuels, particularly ultra-low sulfur diesel, has resulted in renewed commercial interest in GTL technologies. GTL predominantly relies on the Fischer Tropsch process for converting natural gas to higher alkanes and liquid fuels. The advantage of GTL is that low density, difficult to transport natural gas can be converted into a dense, energy rich, commercially valuable and easy to transport liquid fuel. GTL production is essentially a refinery process requiring complex systems, machinery and operational skills. A major disadvantage of GTL technology is its complexity and high capital cost. Another disadvantage is the GTL process requires large amounts of expensive catalysts (large amounts because they are difficult to reactivate). A further disadvantage of GTL systems is the high temperatures and pressures required for conversion. While some GTL projects are underway in large reserve locations such as Trinidad and Qatar, the complexity of these systems has, so far, made them impractical for offshore and smaller scale applications. GTL is impractical and non-economic for capture and transport of natural gas from smaller or offshore fields. Furthermore, while GTL is a higher energy density fuel, SNG preserves the natural gas in its original state that continues to be a preferred state for many industries.

The disadvantages of the systems and approaches described above have led to the consideration of natural gas hydrates for natural gas transport. Solid Natural Gas (SNG) offers a number of advantages over LNG, CNG and GTL.

Safety is a significant advantage of SNG versus all other forms of transporting or storing natural gas; the volatility (explosive risk) of SNG is very low. The dissociation of SNG is an endothermic process, meaning that large amounts of heat are required to release the gas stored. The low thermal conductivity and auto cooling effect of hydrate dissociation further reduce the volatility of SNG compared to both LNG and CNG. As compared to LNG and CNG, another strong advantage is the significantly higher temperatures and lower pressures, respectively, required to form and maintain SNG. This directly translates into less complicated containment systems for SNG product versus LNG and CNG. CNG requires an enormous amount of costly and extremely heavy steel to contain the gas at extreme pressures. LNG requires heavily insulated, costly and complex containment systems that can maintain integrity and function at cryogenic temperatures. The formation temperature of SNG is ~2° C. to 6° C. compared to a liquefaction temperature of −160° C. for LNG. The higher formation temperature translates into a higher Coefficient of Performance for the required refrigeration system, and therefore a higher energy efficiency. A disadvantage of SNG is its lower compression ratio (155:1) compared to both LNG (600:1) and versus CNG (150:1 vs 200:1). The lower effective compression or density factor of SNG translates to a need for larger and/or more ships or containment vessels.

DESCRIPTION OF THE DRAWINGS

FIGS. 1C and 1D are diagrams illustrating an end view of one embodiment of a tank unit.

FIGS. 1E, 1F, 1G and 1H are diagrams illustrating various aspects of a rack system that can be used in connection with the modular clathrate hydrate systems according to one implementation of the invention.

DESCRIPTION OF EXEMPLARY EMBODIMENT(S)

Overview

Figure 1A:
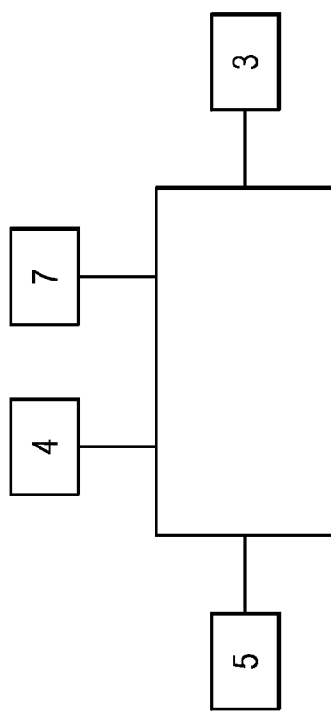
FIG. 1A is a block diagram of one embodiment of a clathrate hydrate tank unit.

Discussion of Proposed SNG Transportation Systems in Current Art

A strong advantage of SNG versus the other transport models is the so-called "metastability" of gas clathrate hydrate. SNG can remain stable and in state at much lower pressures than predicted by conventional thermodynamics. This characteristic was first described in U.S. Pat. No. 5,536,893 to Gudmundsson. Clathrate hydrate metastability theoretically may allow gas clathrate hydrate to be transported in large, refrigerated gas clathrate hydrate carriers at atmospheric pressure and approximately −10° C. The ability to transfer the clathrate hydrate at atmospheric pressure would considerably lessen the cost of the vessel compared to a high pressure or cryogenic vessel.

Motivated by the metastability characteristic of SNG, much prior art regarding SNG-type gas transportation has focused on continuous flow type production process. Continuous flow processes offer the advantage of creating large, constant production volumes. The bulk of prior SNG transportation art focuses on the continuous production of a gas hydrate and water slurries. See U.S. Pat. Nos. 2,356,407, 6,082,234, 6,038,235, 6,180,843, 5,964,093, 6,082,118, 6,653,516, and 6,653,516. These systems typically involve mixing a clathrate hydrate forming gas and water at low temperature and high pressure with the objective of maximizing the surface contact area between the two. Slurry-type hydrate formation systems require complex machinery. Proposed commercial systems are complex refinery-like structures that will require constant monitoring and maintenance by highly trained technicians. Furthermore, these proposed slurry systems have many moving parts and high-pressure seals that are prone to wear and tear and plugging. Small problems or failures in these production systems can cause system wide failure and shutdown. The large complex nature of these slurry-type SNG systems presents disadvantages similar to those of LNG and GTL: all are costly, complex, land-based, immobile systems requiring large fixed capital investment. As such, these approaches are or may be largely appropriate only to the movement of natural gas from land-based gas reserves large enough to support the required capital investment.

Slurry-type systems require large amounts of energy to mix and move the slurry throughout the system and are prone to clogging, seal breakage and equipment failure. A further disadvantage of these systems is the large amount of occluded water in the resulting gas hydrate matrix meaning the resultant hydrate slurry has a low gas compress-ability ratio or density. This increases the required volume and lowers the energy density of the SNG product and thereby increases the required scale of gas transport and storage infrastructure. To alleviate this problem some of the prior art relies on additional processing steps to remove the interstitial water which adds further complexity to the system.

One method of gas clathrate formation involves formation of clathrate hydrate as SNG pellets in a continuous process. The form of clathrate hydrate thus produced manifests as small pellets approximately 12 to 20 millimeters in diameter. Another clathrate slurry process is also dependent on a refinery-like infrastructure. In this approach, the clathrate is formed in a continuous process as unconsolidated slurry that can be moved on conveyers from the manufacturing plant to a ship or storage facility. These two processes appear to have many of the same advantages and deficiencies discussed above with respect to SNG slurry processes in general. Nevertheless, it is clear that both methods target large-scale medium to short distance shipping operations as their prospective commercial base.

While the slurry-based continuous production approaches appearing in prior art may be appropriate to certain shipping applications, they have a number of serious disadvantages, which, if corrected, may improve these approaches significantly and broaden their utility. These current deficiencies include: complex, multi-step process with significant maintenance and production issues; requirement for large, fixed capital investment; Poor packing density of the clathrate hydrate; requirement of loading and unloading substantial weight (hydrates are water based and slurries often contain much non-clathrate water); requirement for separate storage systems; failure to reuse costly cold energy; and potentially significant gas loss to the atmosphere.

Some recent art has focused on batch process alternatives to natural gas hydrate production. In particular, U.S. Pat. No. 6,389,820 to Rogers describes an in-situ, quiescent hydrate formation system that appears to have the potential to resolve some of the deficiencies of the continuous production approaches. For example, SNG packing density may be substantially increased in controlled, self-contained environments versus the open, continuous process systems. In addition, creation and storage of gas clathrate hydrate product in one self-contained vessel simplifies the clathrate hydrate formation and storage process by eliminating many of the moving parts and multiple processes associated with continuous slurry production and transportation.

Gas Storage

Once produced and delivered to port or pipeline, natural gas must be distributed to a wide variety of end users. While the production and distribution of gas is relatively constant and continuous, variability in demand requires that surplus gas be stored during times of lower demand so that the surplus stocks thus created can be withdrawn during times of high demand. Historically, the rather large fluctuations in seasonal demand (hot summer, cold winter) have been the dominant problem and focus in gas storage. However, increased industrial usage, the increasingly widespread use of natural gas in cleaner, more efficient electric power plants for mid and peak loads and especially electricity price deregulation have all dramatically affected natural gas demand variance. With deregulated electricity prices, demand for natural gas, the marginal feeder stock for electric production, can vary wildly several times in a single day. The result is that natural gas prices are by far the most volatile commodity price in the world, second only to electricity and nearly five times the volatility of the stock market. Thus, while most clathrate hydrate research and, indeed, most natural gas research, political and regulatory attention and capital investment has focused on natural gas production and delivery to market, there is a powerful need for high availability, multi-cycle storage that can serve as a supply buffer mitigating severe short term demand variance and price volatility.

Conventional Natural Gas Storage

The majority of stored natural gas in the United States is in depleted oil and gas fields. An advantage of these fields is their very large storage capacities. Another advantage is the relative low cost associated with developing the fields and providing their storage services to end-users. A serious disadvantage of depleted field storage is the inability to withdraw or inject large amounts of gas over short time spans. A further disadvantage of depleted gas fields is that they require large amounts of "cushion gas" (gas that is injected to create pressure and cannot be withdrawn commercially) that represents a sunk cost in the eyes of the operator. Another disadvantage of depleted oil and gas fields is that they are geographically concentrated in the Southwest U.S. and too distant from most industrial, commercial and urban demand centers to serve a useful buffer function versus any but the longest (seasonal) demand cycles.

Man-made salt caverns are a means of storing gas underground that allows for rapid, large-scale injection and withdrawal. This method of natural gas storage might have served well as a short term demand buffer but, unfortunately, salt domes in the U.S. are also geographically limited to the Southwest U.S. Further, they have the further disadvantage of requiring the disposal of large amounts of concentrated brine when they are built.

The U.S. gas pipeline system contains a significant amount of gas in transit to its commercial destination. An additional problem in the conventional gas storage model is the fixed capacity of the U.S. pipeline system. The system frequently experiences bottlenecks during peak demand period such that natural gas must be rationed both contractually and by means of the pricing mechanism. Further, it is impractical to build new pipelines in many areas where new capacity is needed because of civil or regulatory resistance and high costs. Thus, even if salt domes were closer to major urban centers in the U.S., the U.S. natural gas pipeline system would struggle to deliver buffer gas to the end-users during peak demand periods.

Clathrate Hydrate Alternative to Conventional Large Scale Storage

The conventional natural gas storage paradigm involves a large scale (one billion cubic feet or more (BCF)) of natural gas stored in one place. An alternative large-scale method for storage of natural gas utilizes clathrate hydrates. There are several possible methods for creating and employing clathrate hydrates as a means for large-scale natural gas storage. The slurry methods discussed above could be adapted to a remote large-scale storage system whereby the pellets are, or slurry is, contained in an insulated tank or holding device until disassociation and delivery of the natural gas to the pipeline is required. In such a storage model, heat loss (loss of cold and premature disassociation of the gas) during storage would become a significant concern.

To mitigate heat loss, the pellets may be stabilized at lower pressure and/or higher temperatures than is possible with unstabilized natural gas clathrate hydrate pellets. Particle size alone can stabilize clathrate hydrate for long periods—as long as 2 years. There is research on natural gas clathrate hydrate particles that indicates that for certain specific particle sizes and shapes of natural gas clathrate hydrate (typically spherical, 0.5 mm to 20 mm diameter) a natural gas clathrate particle can be formed at −20° C. at 1 Atm and then stabilized by raising the temperature. When the temperature of these particles is raised to ~0° C., a film of water-ice forms on the particles which permits the clathrate to be stored without gasification at atmospheric pressure. By optimizing pellet formation, size and temperature, the large-scale storage, supply and transportation economics of hydrate storage supply could be markedly improved.

There is an additional physical chemistry mechanism— "armoring"—that may provide additional stabilization at even higher temperatures than 0° C. Armoring is a process whereby materials, such as, emulsions may be stabilized against decomposition or alteration by coating the material with clay—nanoplatelets and finely divided oxide particles (MgO). The action of the coatings (armoring materials) is to make an impermeable barrier, which would aid in minimizing vaporization and vapor transport within and from the clathrate hydrate particles. This can make the clathrate hydrate particles stable at higher temperatures and lower pressures, and thus provide even longer times of solid clathrate hydrate stabilization than would otherwise be expected or appropriate by the particular PVT data for a specific clathrate hydrate and guest molecule. One such strategy involves the armoring of the clathrate hydrate with Aphrons. Aphrons, in standard use, are essentially surfactants that are armored to avoid excessive water infiltration into an oil or gas producing well. For natural gas clathrate hydrates of the above described size range (1.5-20 mm diameter), armoring with Aphrons may create a gas tight barrier on the clathrate at higher than 0° C. Using other coatings such as viscous hydrocarbon films combined with Aphron armoring may provide stabilization at even higher temperature.

Long term storage at relatively high temperatures at ambient pressure (1 Atm) enabled by armoring or other clathrate hydrate stabilization strategy may be a valuable strategy for creating a seasonal, large scale supply buffer in regions where there are limited underground alternatives. Further, armored or otherwise stabilized clathrate pellets would be of significant strategic value in clathrate transportation of natural gas.

Utilization of Cold Environments for Large Scale Storage of Clathrate Hydrates

Another important capability and methodology of clathrate formation/production, and storage is to situate a clathrate hydrate production and storage system in a seasonally or perpetually cold environment. Northern U.S., Canada, Russia and Europe have locations where <−20° C. local temperatures occur for extended periods. By judiciously selecting the location and creating large volumes of armored clathrate, it may be possible to have very low energy costs for clathrate production and storage by using natural climates or seasonal energy sources in combination with natural gas or other gas clathrate hydrates.

Carbon-Clean Combustion Cycle Based on Clathrate Hydrates

Another potentially important use of clathrate hydrates in storage involves clathrate hydrate storage of two gases integrated with a natural gas turbine combustion cycle to create a clean, non-polluting power production cycle. Natural gas clathrate hydrates may be used to a) store the natural gas fuel pending combustion and b) use that same clathratization strategy and system to separate $CO_2$ from the combustion output and c) store resultant $CO_2$ by-product for later use, sale or sequestration—thus creating a carbon-clean combustion cycle based on clathrate hydrates.

Clathrate Hydrate Gas Storage Addressing the Supply Buffer Problem

Importantly, none of the above large-scale methods addresses one major problem in the natural gas industry—the lack of an effective supply buffer capable of effectively mitigating against peak demand supply shortfalls and supply disruptions which occur periodically over relatively short term periods. This supply buffer problem is very large scale but, as previously discussed, cannot be addressed by remotely placed large-scale storage models. Further, the current short-term supply buffering strategies fall well short of solving the problem. Where peak gas demand is significant and problematic (i.e. cannot be conventionally mitigated through storage or pipeline capacity), LNG or Propane-Air mixes are sometimes used to meet the excess demand. LNG and Propane-Air systems are expensive. Propane is expensive and in increasingly short supply. The cryogenic tanks required to carry LNG and the complexity and cost of LNG liquefaction systems as well as the energy-related cost of creating LNG make these systems prohibitively expensive for large scale peak demand buffering. Furthermore, both LNG and Propane-Air systems and storage are highly volatile, presenting safety risks and locational challenges (regulatory and political resistance).

When peak demand exceeds supply and current buffer strategies prove inadequate and pipeline operators initiate a scaled role back of service both by price allocation and by rote, contractual interruption of supply. The economic costs of such extreme measures can be significant. The increased frequency with which such allocations or price jumps are taking place combined with forecasts that these events will occur more frequently in the future is of great concern to industry and government. Of further public concern is the relative vulnerability of the U.S. pipeline system to intentional or naturally caused disruption. There is a clear need to create a system-wide natural gas supply buffer located near points of use (i.e. distributed) to protect against the economic consequences of natural gas supply disruption.

SNG for gas storage offers a number of advantages over the supply buffer processes outlined above. Like LNG and Propane-air systems, SNG storage is inherently independent of local geology and enables gas storage to be positioned close to end users. Unlike LNG, CNG, or Propane-Air systems, SNG is non-volatile (non-explosive). Further, at moderately low temperatures (~−10° C.) SNG is stable at atmospheric pressure and can thus be stored at relatively low cost for extended periods of time. Further, natural gas can relatively quickly be dissociated from SNG by the addition of heat, thus SNG can enable an adequate supply of natural gas to meet anticipated or unanticipated intraday peak demand situations. Further, the cost of an SNG production and storage system may be significantly lower than alternative systems.

Importantly, for creating an effective, cost-efficient distributed buffer solution, natural gas clathrate hydrate can be formed without reliance on large refinery-type systems. As cited previously, natural gas clathrate can be formed in-situ, that is, formed within a storage facility or tank. There is significant though, compared to continuous process art, very little prior art demonstrating the efficacy of in-situ clathrate formation. Ehsam, U.S. Pat. No. 4,920,752 envisions a segmented, multi-stage clathrate production apparatus within an enclosure. Rogers et al, U.S. Pat. No. 6,389,820, teaches a container having two inlets, a cooling coil and introduced coolant with water and added surfactant for forming and storing gas clathrate hydrates. Placing the clathrate hydrate formation process in the same body in which the natural gas clathrate hydrate is stored can eliminate many of the issues of continuous process including complexity, massive production infrastructure and costly external storage mechanisms. In-the-tank formation and storage offers a number of advantages: high packing density, rapid formation, few moving parts and operational simplicity. Further tanks and the other requisite internal and external components are generally in wide use, readily manufactured at low cost. Further tank systems can be easily moved, stored and stacked such that installation at points of use and operational costs can be managed to acceptable commercial levels. For these reasons, the potential economics (i.e. value to a commercial user of natural gas) of a scalable, mobile in-situ distributed storage system are favorable.

In summary, clathrate hydrates occur naturally and have been known for over 100 years and have been studied intensely. Much is known and much more can be known once clathrate hydrate storage leaves the laboratory and enters the commercial world. The potential for clathrate hydrate storage articulated in the foregoing, for storage for large scale or for distributed industrial and commercial users, however, is wholly unmet. No industrial user-scale, supply buffering distributed clathrate hydrate system exists. No large scale clathrate hydrate storage exists. Such systems can be developed to meet the economic and operational needs of the U.S. natural gas distribution system or large industrial and power production end-users.

¹Thermal Energy Storage

The use of air conditioning for cooling during warmer months has increased steadily in recent years. As a result, many utilities have experienced large power demands in the summer, which impose a severe burden on their generating capacity. These peak loads require expensive peaking generators to meet the peak loads. Moreover, the utilities must maintain this idle expensive generating capacity during periods of lesser demand, which is most of the time. Moreover, if demand is great during a hot period, as frequently is the case, the peaking generators cannot function at maximum efficiency without expensive air-inlet cooling. One alternative to investing in costly peak production equipment applied broadly today is shifting, by means of incentives, electricity consumption from peak demand periods to off-peak periods. Another solution is heat pump thermal energy storage (TES) that has the capability of removing heat from a storage material during off-peak periods and using the cooled storage material as a heat sink during peak demand periods.

Methods of incorporation of cool storage in heat pump and air conditioning systems have been developed, the most common being the use of water or ice as the storage medium. However, both water and ice have their disadvantages. Large volumetric storage capacities are required for cool storage systems that utilize the sensible heat capacity of water. In addition, water storage systems must typically operate over a large temperature range to be effective. In ice storage systems, the low temperatures that are required to freeze ice and the heat exchange penalty resulting from ice buildup on the heat exchanger coils reduce air conditioner performance and increase operating costs. In addition to water and ice, use of hydrated salts as a storage medium has also been investigated. Studies have also been performed to develop aqueous organic hydrates for use as a cool storage medium.

In recognition of the problems associated with both chilled water and ice type storage systems, various clathrate hydrate systems are described in the prior art. See U.S. Pat. Nos. 4,821,794, 4,840,652, 5,140,824, 6,560,971 and 6,640,580. The primary advantage of clathrate hydrate thermal energy storage is that clathrate hydrates have higher formation temperatures than water ice. This higher formation temperature results in more efficient chiller operation. As is the case with clathrate hydrate-based gas transportation, the prior art on thermal energy strategies utilizing clathrate hydrate is predominantly focused on continuous production of clathrate hydrate slurries. However, as previously stated, these continuous process systems are complex, with many moving parts, susceptibility to clogging and require separate storage strategies in addition to the formation process. A further disadvantage of known clathrate hydrate thermal energy storage systems is the reliance on Hydroflourocarbons (HFC's), which are known to be damaging to the ozone layer.

In the area of clathrate hydrate-based thermal storage, there is a clear need for a mechanically simple, low maintenance clathrate hydrate based thermal energy storage (method/apparatus) that could be easily integrated with existing chillers. The system would preferably be scalable and easy to install. The system would also enable the use of environmentally benign refrigerants such as CO2. The in-situ system described above under "Clathrate Hydrate Gas Storage Addressing the Supply Buffer Problem" meets the requirements for, scalability, operational simplicity, ease of integration and environmental suitability.

Gas Separation

In many applications where mixtures of two or more gaseous components are present, it is often desirable to selectively remove one or more of the component gases from the gaseous stream. Of increasing interest in a variety of industrial applications, including power generation, chemical synthesis, natural gas reforming, and conversion of methane hydrates to hydrogen and $CO_2$, is the selective removal of $CO_2$ from multi-component gaseous streams.

A variety of processes have been developed for removing or isolating a particular gaseous component from a multi-component gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated. Despite large amounts of investment and research, these systems still require very large amounts of heat energy to operate.

In recognition of the high energy requirements required for $CO_2$ separation using the above listed techniques, several researchers have investigated the application of clathrate hydrates for gas separation. Clathrate hydrate formation can be achieved at relatively moderate temperatures (~0 C) and pressures (20-40 bar). U.S. Pat. Nos. 5,562,891, 5,700,311, 6,090,186, 6,028,234 and 6,106,595 describe the continuous separation of $CO_2$ from multi-component gas streams via the production of a $CO_2$ clathrate hydrate slurry that is then dissociated to produce a relatively pure $CO_2$ stream. The process can be done over multiple stages to facilitate a more complete separation. U.S. Pat. No. 6,602,326 describes the use of small amounts of additives to dramatically lower the pressures required for $CO_2$ hydrate formation. As with the clathrate hydrate-based natural gas transport systems, gas separation system prior art is dominated by proposed continuous slurry-type production systems. These systems require complex, multistage formation and dissociation steps to produce a relatively pure $CO_2$ gas stream. The large costs associated with such a complex system require large applications to achieve economies of scale, and are therefore unsuitable for many inherently smaller applications. A further problem associated with the implementation systems is the question of how to dispose of the $CO_2$ once it has been separated.

Based on the above limitations it would be desirable to create a gas separation (method/apparatus) system that would be mechanically simple, scalable, redeployable, and transportable. It would also be advantageous to reuse the cold energy created to store, and transport the produced $CO_2$ to a beneficial user such as a heavy oil field for enhanced oil recovery.

Desalination

The potential for use of gas clathrate hydrates for desalination is known. These proposed systems generally take advantage of the fact that gas clathrate hydrates form at higher temperatures than the freezing point of water. The bulk of the prior art, such as U.S. Pat. No. 5,873,262, and patent application Publ. No. 2004/0029713 take advantage of near freezing water at ocean depths to provide the latent heat required for hydrate formation. These systems further take advantage of the natural buoyancy of gas clathrate hydrates to produce a continuous flow type process that relies on a bubble lift effect to pump the resulting clathrate hydrate slurry ashore. Despite the comparatively large amount of literature and publicized small-scale field tests, there has been, to the inventors' knowledge, no successful scale applications of gas hydrate desalination. The primary difficulty with such continuous flow, slurry type desalination processes is the separation of the resulting slurry from the by-product brine. In many respects this is similar to the problems of occluded water and low packing density in gas continuous process clathrate hydrate storage and transport systems. A further disadvantage of such systems is that they are reliant on placement nearby near cold (~0-4° C.) sea water. Many areas, such as the Middle East, do not have access to local, proximate sources of such naturally occurring cold water.

There is, therefore, a need for a gas clathrate hydrate desalination apparatus that will produce large blocks of gas clathrate hydrate with very little occluded brine. The system should preferably be capable of using both conventional, high efficiency chillers and/or cold sea water for the formation of the clathrate hydrate. The latent heat that is added to produce dissociation would preferably be used for further gas clathrate hydrate formation in an adjacent tank or serial tank system. The system may incorporate any number of promoters to lower the required pressures and raise the required temperatures for clathrate hydrate formation. Preferably these additives would not be incorporated into the growing hydrate masses, but rather would be occluded as the clathrate hydrate mass grows along with the solutes (brine) that are desired to be removed. Sodium Dodecyl Sulfate is one such additive that enhances the formation of gas clathrate hydrate without being incorporated.

Such a desalination system would preferably be mechanically simple and provide as much flexibility as possible. Further, the system would preferably be mobile and capable of being assembled and operated with very little effort or investment. It would also be desirable to be able to thermally integrate other clathrate hydrate and cold energy based processes such as excess air conditioning capacity, natural gas clathrate hydrate transport and unused turbine inlet cooling capacity to provide the cold energy required for cost effective clathrate hydrate-based desalination.

In one implementation, the present invention provides a simple, scalable, low cost clathrate hydrate formation and dissociation system that can be configured to serve a variety of functions including: gas transport, gas storage, thermal energy storage, gas separation, and desalination, and which further allows these various applications to be thermally integrated with one another or other co-generative thermal processes.

Accordingly, the present invention, in one implementation, provides an improved clathrate hydrate system that utilizes a plurality of standardized, interconnected clathrate hydrate formation and dissociation units. The invention, in one implementation, is characterized by the plurality of clathrate hydrate units configured into one or more clathrate hydrate storage arrays. Each clathrate hydrate storage array may consist of between 1 and 50 clathrate hydrate units connected by three cell manifolds controlled by a single master controller. The first manifold may deliver the hydrate forming agent to the individual clathrate hydrate units. The second manifold may provide a means of injecting and withdrawing the specific and latent heats of clathrate hydrate formation and dissociation from the individuals units. The third manifold may provide a means of injecting and withdrawing an aqueous solution with any number of potential gas hydrate promoters.

In another implementation, the present invention provides a modular, scalable framework consisting of easily transported, interconnecting clathrate hydrate formation and dissociation modules for a variety of applications including gas transport, gas storage, thermal energy storage, gas separation, and desalination.

In another implementation, the present invention provides a system that utilizes, wherever possible, widely used and, thus, low-cost, components, manufacturing designs and processes to minimize the capital outlay per unit of gas or thermal energy storage capacity.

In another implementation, the present invention provides a standardized framework that can accommodate additional or new improvements to the clathrate hydrate formation process thereby enabling the user to avoid investing in a new systems or architectures as the art continues to progress.

In another implementation, the present invention provides a low free surface energy coating on the heat removing surfaces to prevent the formation of heat flux inhibiting clathrate hydrates on the heat exchanger surfaces.

In another implementation, the present invention provides a means of thermally integrating individual gas hydrate units to allow the transfer of latent heat from a first gas clathrate hydrate unit to another gas clathrate hydrate unit, thus allowing the dissociation of gas hydrates in the first tank, and the formation of gas hydrate in the second.

To date, there appear to have been no references in prior art or published attempts to apply quiescent in-situ hydrate formation, storage, and dissociation to gas transportation. Furthermore, the clathrate hydrate art fails to address the problem of unloading and dissociating the gas hydrate from the transportation vessels. Furthermore, the prior art regarding gas hydrate transportation also fails to describe beneficial uses or preservation of the large amounts of useful cold energy stored in the transport vessel.

In another implementation, the present invention provides a safe, scalable means of transporting natural gas or other gas or other constituent gas in a hydrate medium preferably using existing transportation infrastructure.

The present invention also provides, in one implementation, an improved ship-based clathrate hydrate transportation system that utilizes a plurality of standardized, interconnected clathrate hydrate formation and dissociation units. The plurality of clathrate hydrate units may be configured into a plurality of clathrate hydrate storage arrays. Each clathrate hydrate storage array may consist of between 1 and 50 clathrate hydrate units connected by three cell manifolds controlled by a single master controller. The first manifold may deliver the hydrate-forming agent to the individual clathrate hydrate units. The second manifold may provide a means of injecting and withdrawing the specific and latent heats of clathrate hydrate formation and dissociation from the individuals units. The third manifold may provide a means of injecting and withdrawing an aqueous solution with any number of potential gas hydrate promoters.

In another implementation, the present invention provides a floating refrigeration, production, storage, and offloading (FPRSO) vessel for development of offshore stranded gas. The FPRSO may be moored at the gas field in a similar fashion to existing floating, production, storage and offloading (FPSO) systems. The FPRSO contains a plurality of gas hydrate units arranged in arrays to temporarily store the resulting gas hydrate until a hydrate carrier is moored nearby for offloading of hydrates.

In one implementation, the present invention provides a means utilizing cold seawater to remove the latent heat in formation of the clathrate hydrate. In one implementation, the present invention provides on or near-site natural gas storage such that the operator can reposition, move or scale the system as needs change without great inconvenience or cost. In one implementation, the present invention provides a safe, economic, easy to adopt, simple-to-manage means of capturing and storing natural gas or other constituent gas in a hydrate medium at or near an industrial or power generation or other point of use. In one implementation, the present invention provides a beneficial use of the latent heat associated with the stored gas at a power plant end user by transferring the latent heat to a turbine inlet cooling coil, thereby increasing the net output of the power plant. In one implementation, the present invention provides a means of preserving the stored latent heat incorporated in the gas clathrate hydrate for later reuse by transferring the cold energy to a an array of units dedicated to thermal energy storage.

In another implementation, the present invention provides a modular, scalable thermal energy storage system that can be integrated into existing air conditioning, turbine inlet cooling and other cooling systems without significant modifications to the chillers or other equipment.

In another implementation, the present invention provides a modular, scalable gas separation system that can be easily integrated into existing multi-component gas stream producing systems. The system may be comprised of a plurality of standardized, modular gas hydrate formation and dissociation units that can be operated individually and/or as a collective unit. In another implementation, the present invention provides an integrated gas separation and gas transport system using a plurality of interconnecting, modular clathrate hydrate formation and dissociation units. In another implementation, the present invention provides a means of enhancing peak power output of combustion-based power plants, for example, by using $CO_2$ clathrate hydrate separation by diverting cooling input from the clathrate hydrate formation reactor to an inlet air cooling device. In another implementation, the present invention provides a means of utilizing the cold energy of the input fuel of a natural gas hydrate fueled power cycle.

In another implementation, the present invention provides a modular desalination system comprised of quiescent clathrate hydrate formation and dissociation tanks. The desalination system is capable of co-generatively using other sources of available cold energy. In one implementation, the present invention also provides a means of advantageously using the cold energy of natural gas clathrate dissociation to desalinate sea water. The desalination process may be either ice or clathrate hydrate based.

In another implementation, the present invention provides for integration of the storage system with other elements of the user's processes such that the inherent characteristics of the clathrate hydrate storage system, particularly the refrigeration systems and resultant cold thermal energy, can be coupled to the user's processes such that the total costs of the system are optimized and the thermal values created thereby are fully utilized.

To achieve one or more of the foregoing advantages or features, the present invention, in one implementation, is directed to the design of a standardized, modular, clathrate hydrate formation and storage architecture wherein clathrate hydrates are used as the storage medium in, the clathrate hydrates are formed in-situ in accordance with the best science and art currently available, and the design is capable of accommodating improvements that may become available in the future.

Description of Modular System and Associated Systems

The modular gas hydrate array system outlined above enables a wide variety of possible commercial configurations for a variety of purposes. Gas clathrate hydrate prior art can be divided into five primary categories: gas storage, gas transportation, gas separation, thermal energy storage, and desalination.

All of these systems require large amounts of thermal energy to remove the latent heat required for clathrate hydrate formation. Despite thermal efficiency being one of the primary economic drivers for commercializing clathrate hydrate technologies, very little attention has been paid to the thermal efficiencies of the prior art. There is similarly a lack of advantageously combining these various applications or other thermally active systems in a synergistic manner. For example, despite the large number of patents relating to gas hydrate formation systems for gas transportation, there are no references to utilizing the cold energy stored in the hydrates for practical advantage during dissociation.

In one implementation, the present invention provides a system that utilizes clathrate hydrate formation and dissociation methods in a manner that enables the advantageous utilization of both the gas and thermal energy storage abilities of gas hydrates.

Individual Clathrate Hydrate Tank Unit

FIG. 1A is a block diagram illustrating one embodiment of an individual clathrate hydrate unit. In this implementation, each gas hydrate unit may be include: a container 1 that is preferably insulated; a means of transferring thermal energy from area 5 to area 3 through the container; a means for injecting or withdrawing the hydrate forming compounds 4; a means for managing and monitoring formation and deformation processes as well as storage status (I/O and manifold) 7; and a means of injecting or withdrawing an aqueous solution 8 that may contain any one or a number of clathrate hydrate promoters such as H-Hydrate formers, surfactants, hydrotopes, activated carbons, etc.

Each clathrate hydrate unit, in one implementation, contains a variety of sensors to facilitate the rapid and efficient formation and dissociation of the hydrates within. These sensors can include pressure transducers, temperature monitors, and fluid level sensors. A controller and management system can be used for on-site or remote operation of manifold inlets and outlets as well as for monitoring the hydrate processes and status. The tank may have an attached control system which may be operated from the tank or which may be operated remotely via a computer interface connected by wire or wirelessly to the control system. Control system software can be designed to obtain, process and report sensor information from a variety of sensors both the on-tank control module and to the remote computer interface. The control system utilizes various sensors to acquire the information required for efficient operation of the tank. These sensors may include valve and flow sensors, temperature sensors in the tank, pressure, temperature and water vapor sensors at the output and/or input, in-tank chemical sensors for measuring the presence of additives or contaminants, video sensors and spectrographic sensors for measuring status of the hydrate.

Figure 3A:
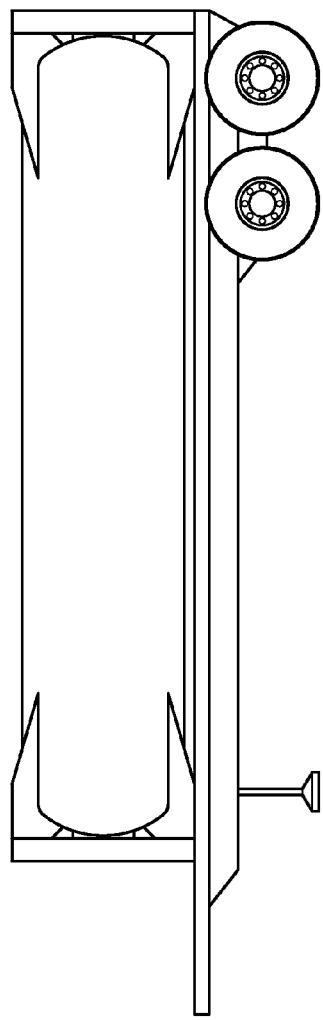
FIG. 3A is a diagram illustrating one embodiment of a clathrate hydrate unit on a tractor trailer.
Figure 3B:
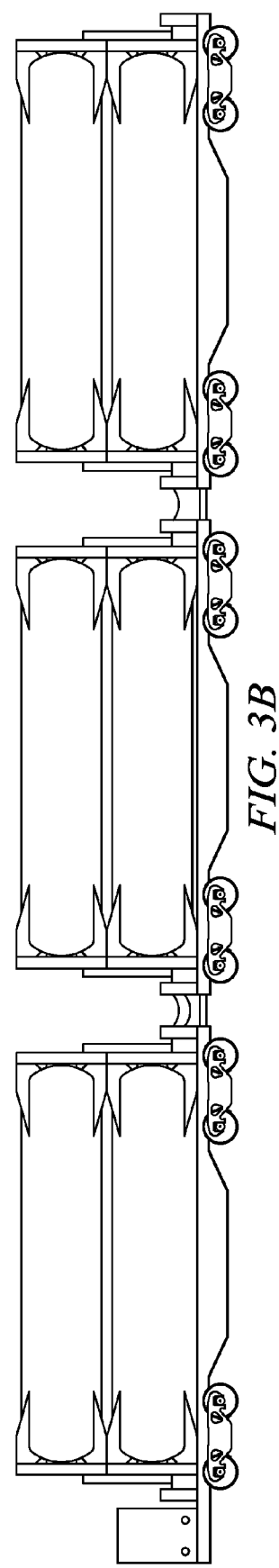
FIG. 3B is a diagram illustrating one embodiment of a clathrate hydrate unit array on a set of railroad cars.

The gas clathrate hydrate containers may range in size from very small, for example for vehicle applications, to very large, for example for ocean transport. Preferably, the tanks conform to ISO standards. In one implementation, a 40-foot ISO tank, shown in FIG. 1B, would be capable of being transported using existing intermodal transport methods including trucks as shown in FIG. 3A, rail as shown in FIG. 3B, barge, or ship. A further advantage of using existing ISO standards is that the tanks could be transported on existing container ships. The tanks may be insulated to ensure thermal efficiency.

Figure 1B:
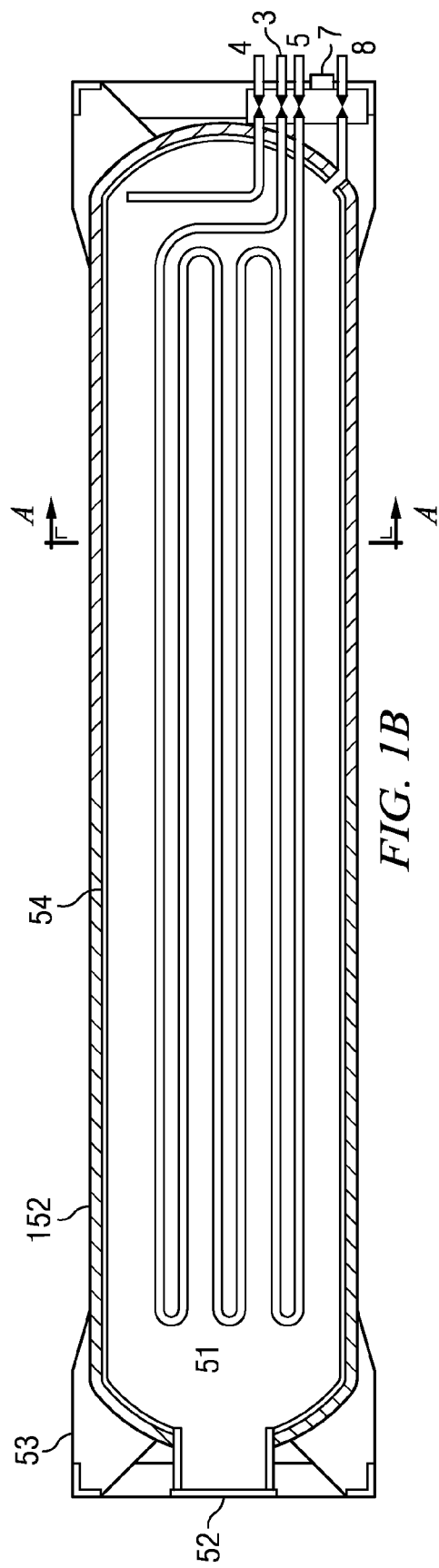
FIG. 1B is a diagram illustrating a cutaway side view of one embodiment of a tank unit.

As shown in FIG. 1B, the container may be a pressure vessel 152 that is covered by sufficient insulation 54 to minimize heat flux across the tank walls. In this implementation the pressure vessel is supported on both ends by structural elements 53 that are capable of supporting large amounts of weight. The tank may have a removable manhole cover 52 that will enable a worker or instrument to inspect the condition of the tank.

The clathrate hydrate forming substance, for example natural gas, is injected and withdrawn from the tank via port 4, as shown in one embodiment in FIG. 1A. The gas inlet and outlet ports may be coated with a low free surface energy material such as Teflon to prevent hydrate formation within the gas piping system.

Thermal energy is transferred from 3 to 5 via a heat exchanger 51, which in one implementation, comprises one or more tubes or coils. Preferably the heat exchanger has a large surface area and is made of a material with a high thermal conductivity such as aluminum. In one embodiment, the clathrate hydrate solution contains an amphiphylic promoter such as sodium dodecyl sulfate. The addition of a small amount of surfactant causes the hydrates to form on high free surface energy surfaces such as aluminum. Rogers describes the preferential use of aluminum heat exchanger tubes because the clathrate hydrates can form on the actual heat exchanger surface. However, the poor thermal conductivity of the growing hydrate layer dramatically may reduce the efficiency of the heat exchanger. Therefore, in the preferred embodiment the inner lining of the pressure vessel is comprised of a high free surface energy material such as aluminum or steel, whereas the heat exchanger is covered with a low free surface energy coating such as Teflon or PTFE. The combination of high free surface energy material on the inner lining of the tank and low free surface energy coating on the heat exchanger will cause the clathrate hydrate to grow from the outside of the tank annularly inwards. The net effect is that hydrates do not form on the heat exchanger material and therefore do inhibit heat transfer to and from the surrounding liquid.

Manifold and Systems Interfaces, Inputs and Outputs

The tanks may have standardized input and output ports for insertion and withdrawal of gas, insertion and withdrawal of water, insertion and withdrawal of hydrate formation catalysts and monitoring of in-situ processes. These ports will be arranged such that multiple tanks can be assembled and stacked or aligned in proximity to enable an array of such tanks to act as a single system. Preferably, a manifold may be placed on one end of the tanks such that interconnection is enabled in vertical or horizontal stacking configurations.

Rack System for Transport and Interlocking of Units

A significant drawback to the clathrate hydrate formation systems described in the prior art is that they are comprised of large and/or complex production infrastructure that cannot be assembled or disassembled rapidly. Both the continuous production methods and the batch system suggested by Rogers require significant site preparation in the form of foundations.

In one implementation, the present invention simplifies the assembly of a clathrate hydrate formation and dissociation system by integrating each formation and dissociation unit with a self contained structural system that will allow each unit to be moved individually without the need for external infrastructure.

Figure 2A:
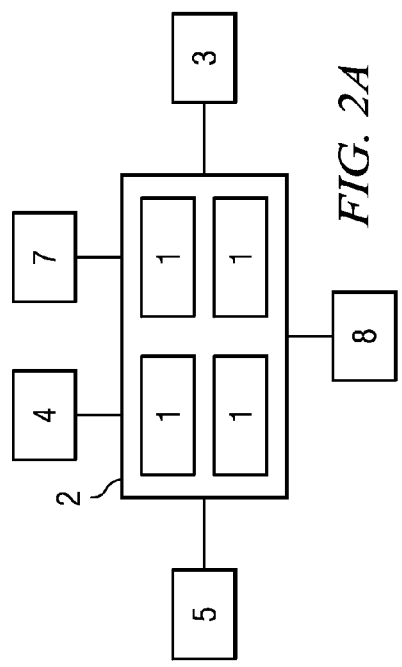
FIG. 2A is a block diagram illustrating one embodiment of a clathrate hydrate unit array system.
Figure 2B:
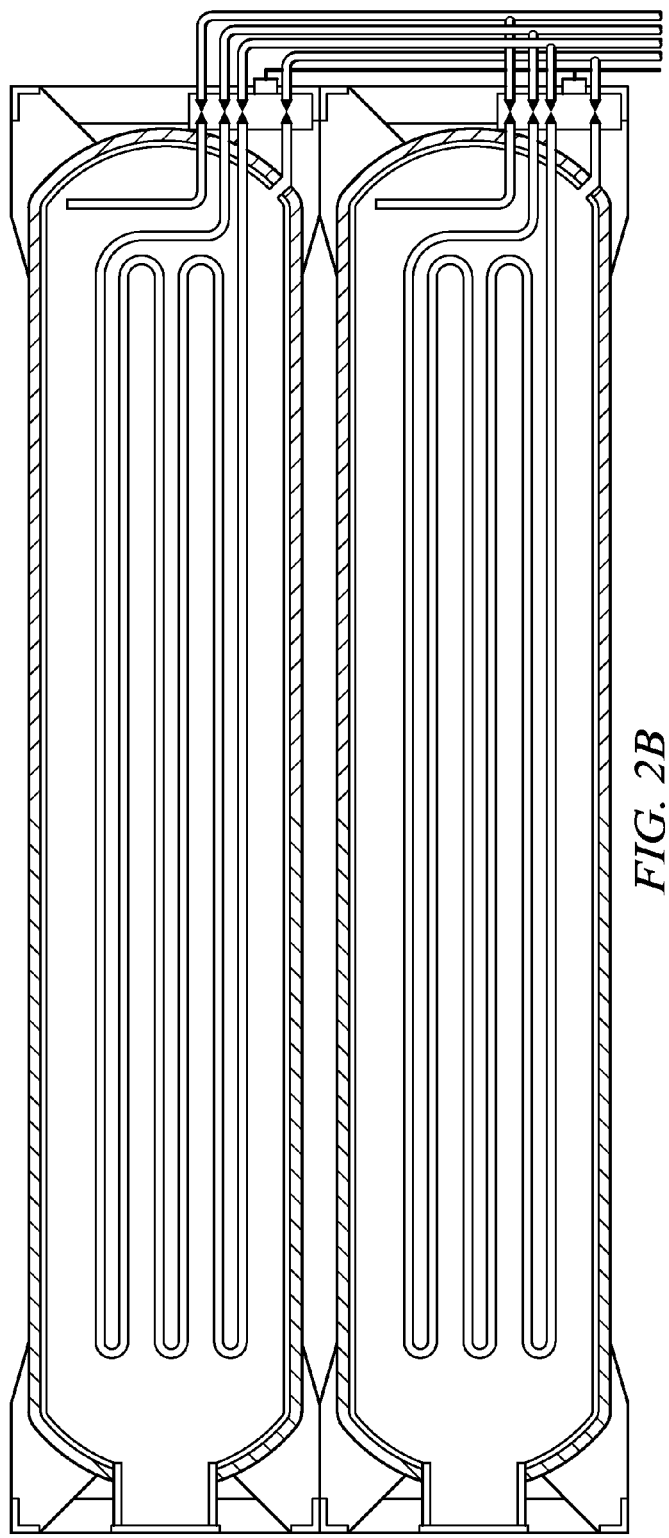
FIG. 2B is a diagram illustrating a cutaway side view of the arrangement of the clathrate hydrate units within the clathrate hydrate array, according to one embodiment.
Figure 2C:
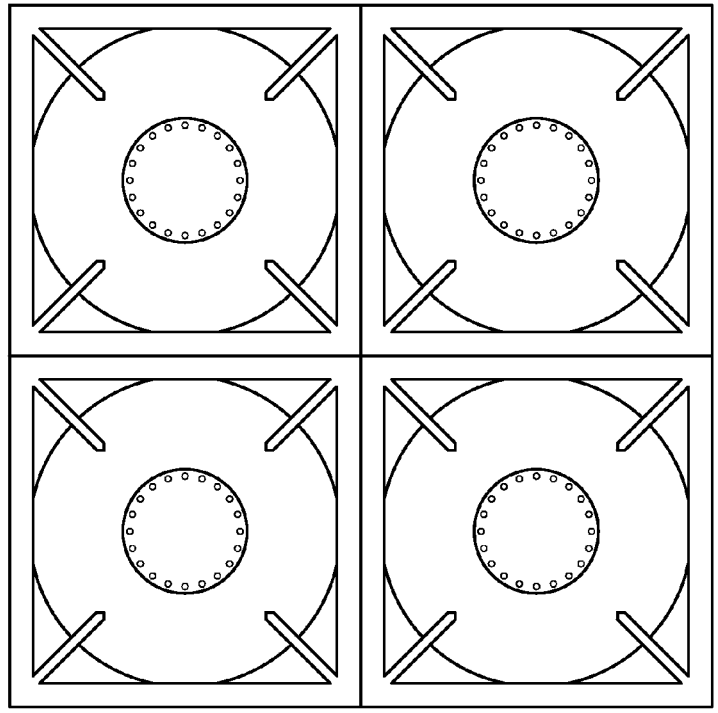
FIGS. 2C and 2D are diagrams illustrating an end view of one embodiment of a clathrate hydrate array arrangement.
Figure 2D:
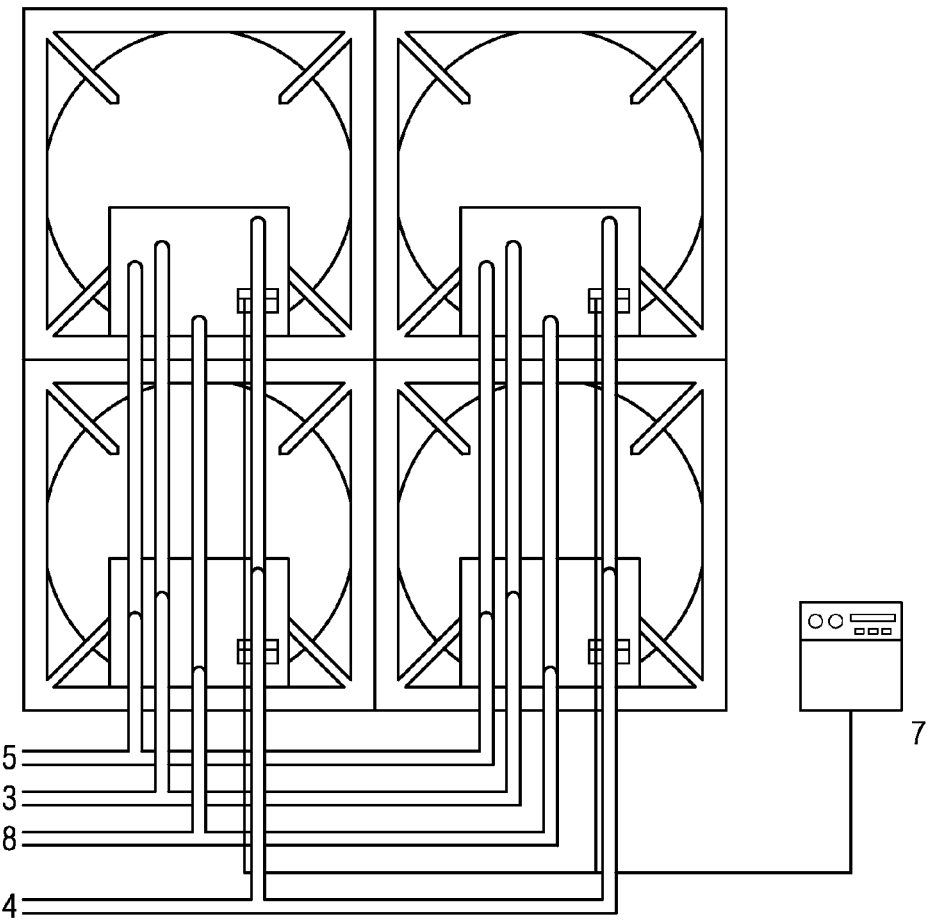

FIGS. 1E, 1F, 1G and 1H are diagrams illustrating various aspects of a rack system that can be used in connection with the modular clathrate hydrate systems according to one implementation of the invention. As the Figures illustrate, the module may include rack system elements 98 disposed at opposite ends of the container or vessel to facilitate transport of the modules and/or interconnection of the modules in an array. The rack system elements 98 may include holes 99 or other features that allow each rack system element to be secured to a transport vehicle or another rack system element of a second module. The units may be placed within a rack system, or be constructed with an embedded rack system enabling transportation on conventional trucks and rail cars, as illustrated in FIGS. 3A and 3B. Such a rack system may have function and form similar to that employ on overseas tanks and containers such that their locking systems conform to existing standards. The rack systems may also serve to lock the tanks together in a secure array in a fixed or temporary deployment, as illustrated in FIGS. 2B, 2C and 2D.

Gas Hydrate Tank Array System

The present invention relates to a method of creating scalable, easily deployable storage of natural gas and thermal energy by assembling an array of interconnecting, modular gas clathrate hydrate storage units. FIG. 2A illustrates a simple block diagram of such an array. The array 2 shown in FIG. 2A contains four individual gas clathrate hydrate units 1.

In one implementation, the array may include: one or more interconnected gas clathrate hydrate tanks 1; a means for transferring thermal energy (between 3 and 5) to the individual units within the array via a standardized manifold system and standardized interconnection valve and pipe system; a means for injecting and withdrawing a clathrate hydrate forming compound from the individual units within the array via a standardized manifold system and standardized interconnection valve and pipe system 4; a means to inject and withdraw the water and possible hydrate promoters from the individual units via a standardized manifold system and standardized interconnection valve and pipe system 8; and a means for controlling the clathrate hydrate formation, storage and deformation process in the array system 7.

The gas clathrate hydrate tank array 2 may be comprised of at least one gas clathrate hydrate tank unit 1, with no upper limit on the number of units that could be connected together to meet a commercial requirement.

The tanks may be arranged horizontally or vertically. In one embodiment the individual units may be structurally strong enough to allow multiple units to be stacked on top of one another as shown in FIG. 2B-2D.

In one implementation, the injection and withdrawal of the water, possible clathrate hydrate promoters, gas, and thermal energy may be accomplished by a manifold system that also interconnects the individual cells of the array to one another.

A controller 7 would enable automatic and/or remote operation and management of the tank array systems. Such a controller may consist of computing and electronic components that gather and display information from sensors, monitor the system and alert as to operational anomalies, enable remote control of the valves and inlets in each tank such that the system as a whole can be managed efficiently and safely to operate as a coherent whole or set of whole systems. In one embodiment, the controllers on individual tanks may have a capability of operating as a master or slave controller. The slave mode would cause the controller to forward sensor information and operational control to a master controller. In master mode, the controller would report on the status of and control one or more slaves. In another embodiment, master controller function would be further consolidated to a remote a computer interface controller which may be placed in the systems management area of, for example, the power plant operations and connected to the storage array by means of wireless or wired connection.

Gas Storage Without Cold Energy Utilization

The increasing volatility of the natural gas prices combined with and partially caused by the deregulation of the electricity market has resulted in an opportunity for natural gas fired power plants to purchase lower cost, off-peak natural gas. This may occur during the late evening or on weekends when electricity is not in high demand.

Figure 4:
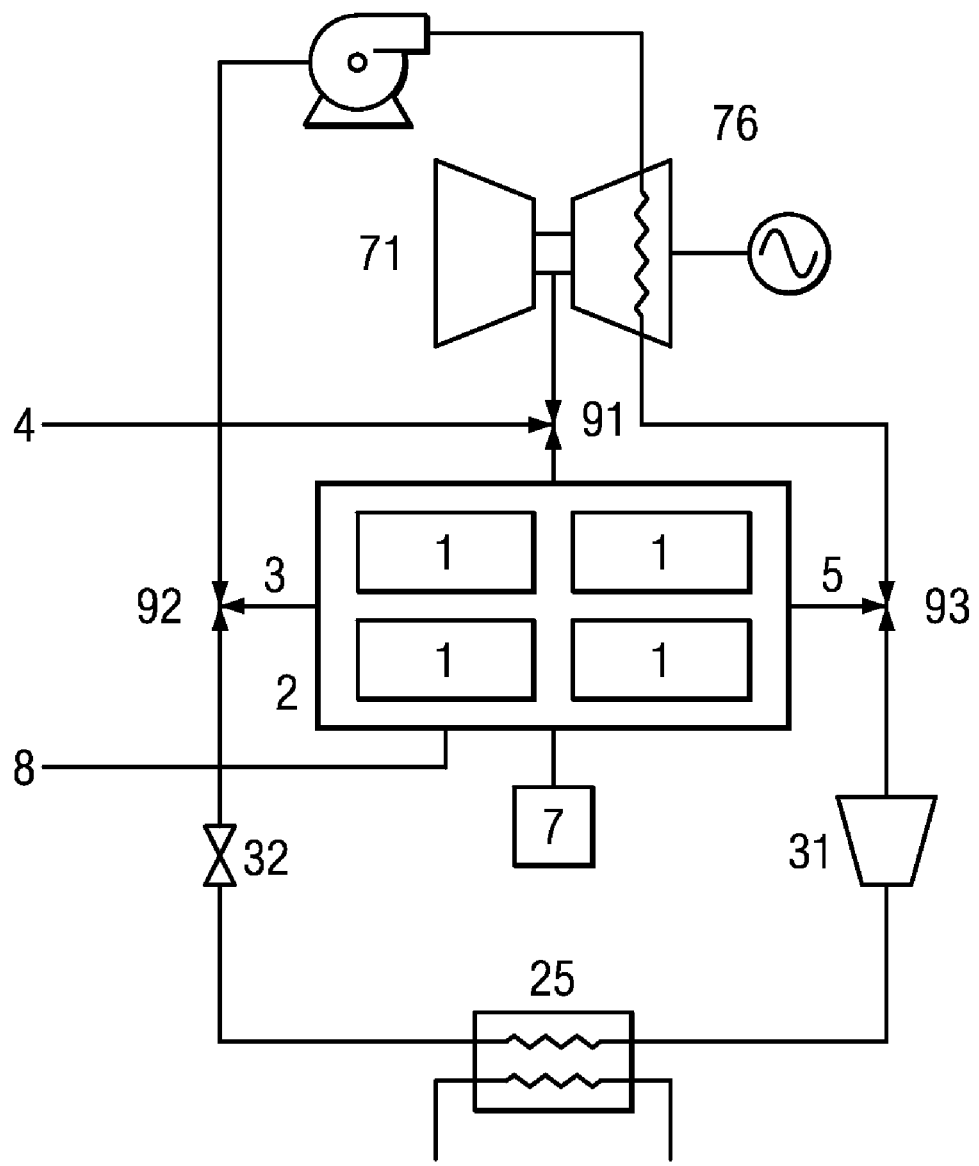
FIG. 4 is a diagram illustrating one embodiment of a clathrate hydrate unit array for gas storage at a gas turbine power plant using power cycle waste heat for hydrate dissociation.

FIG. 4 illustrates an embodiment of the gas clathrate hydrate storage array concept. A refrigeration system may be comprised of a compressor 31, water cooled condenser 25, and a throttle valve 32 used to remove the latent heat from the clathrate hydrate storage array 2 via ports 3 and 5. Off-peak natural gas from the pipeline 4 may be simultaneously injected into the clathrate hydrate array via valve 91. The gas may be dissociated by supplying waste heat from the power plant via heat exchanger 76 to control valves 92 and 93.

A further advantage of such a system is the ability to supply the power plant with larger quantities of gas than the pipeline is designed to deliver. This can be achieved by simultaneously supplying the power plant with gas from the pipeline as well as the clathrate hydrate storage array.

Power Plant Gas Storage with Integrated Thermal Energy Storage

There are two primary drawbacks to the simple gas storage system shown in FIG. 4. The primary drawback to such a system is inefficient use of expensive and complex refrigeration equipment. The economics of a refrigeration system are largely dictated by the amount of time it is being utilized. In the case of simple gas storage, the refrigeration system will remain idle for long periods of time. The second problem with the system shown in FIG. 4 is that the cold energy stored in the clathrate hydrates is lost to the surrounding environment when waste heat from the power plant is used to dissociate the clathrate hydrate and release the stored gas.

Figure 5A:
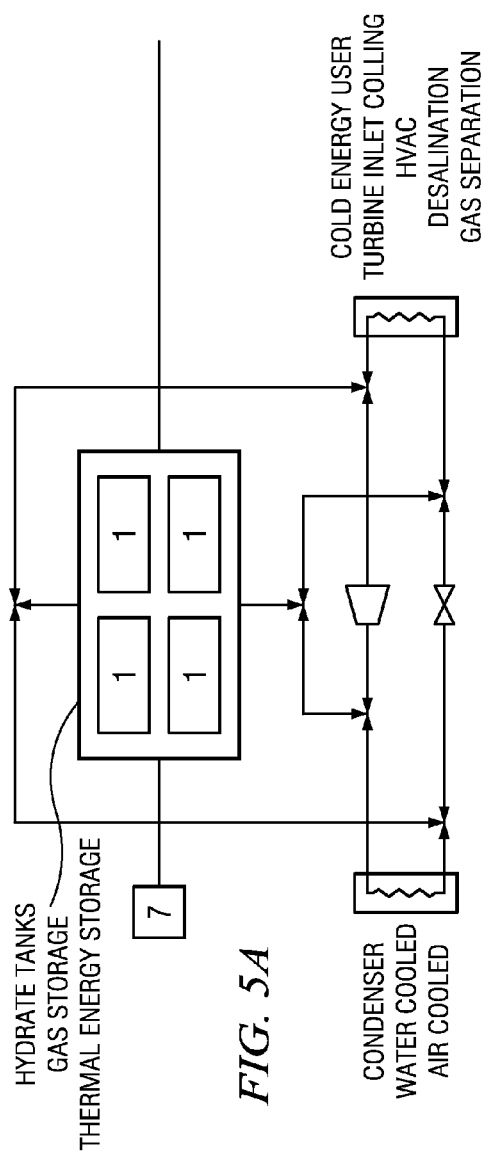
FIG. 5A is a diagram illustrating a generic method of integrating a gas storage application and a cold thermal energy application using a clathrate hydrate unit array.
Figure 5B:
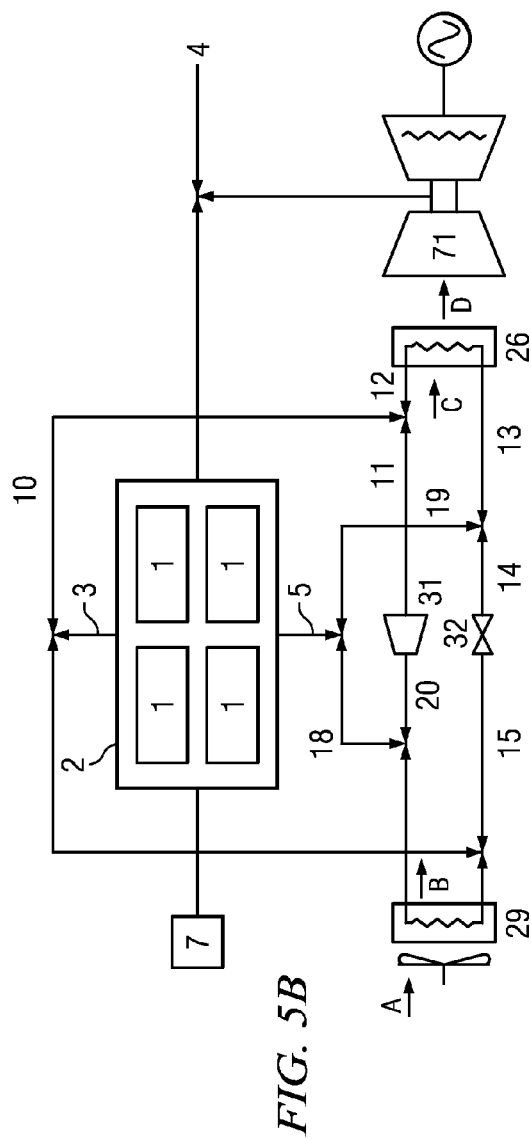
FIG. 5B is a diagram of one embodiment of a clathrate hydrate storage array for a gas turbine power plant utilizing turbine inlet air cooling for hydrate dissociation.
Figure 6A:
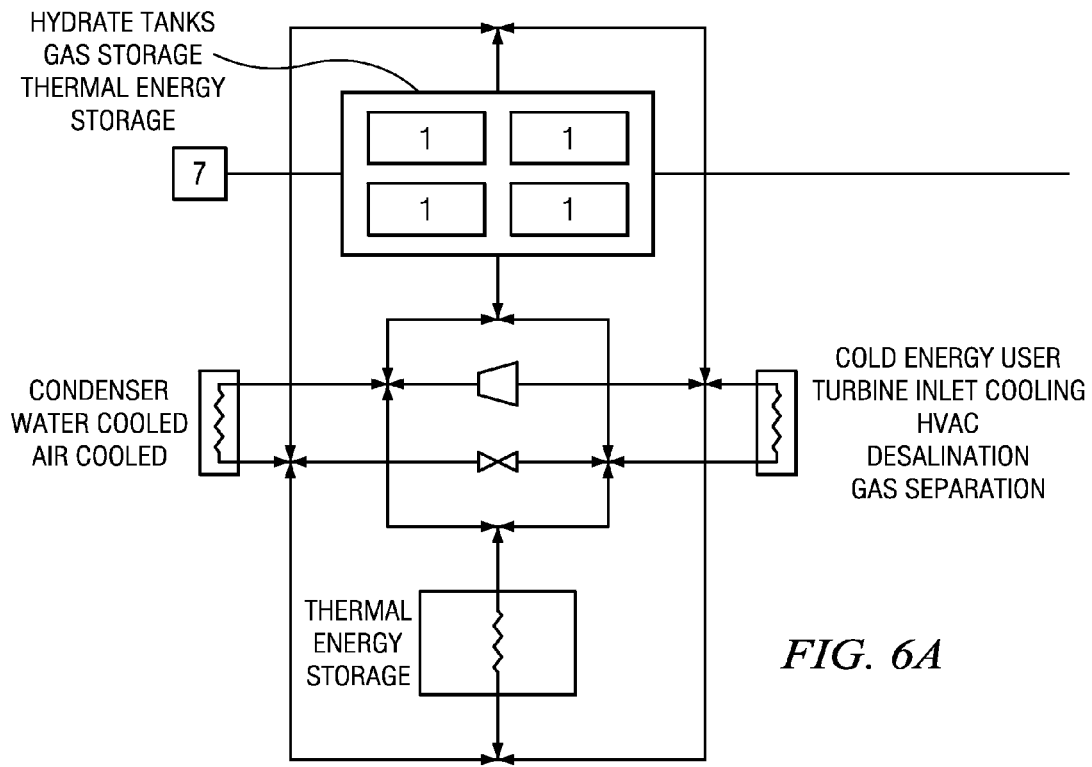
FIG. 6A is a diagram illustrating a generic method of integrating a gas storage application, a thermal energy storage system, and a cold thermal energy application using a clathrate hydrate unit array.
Figure 6B:
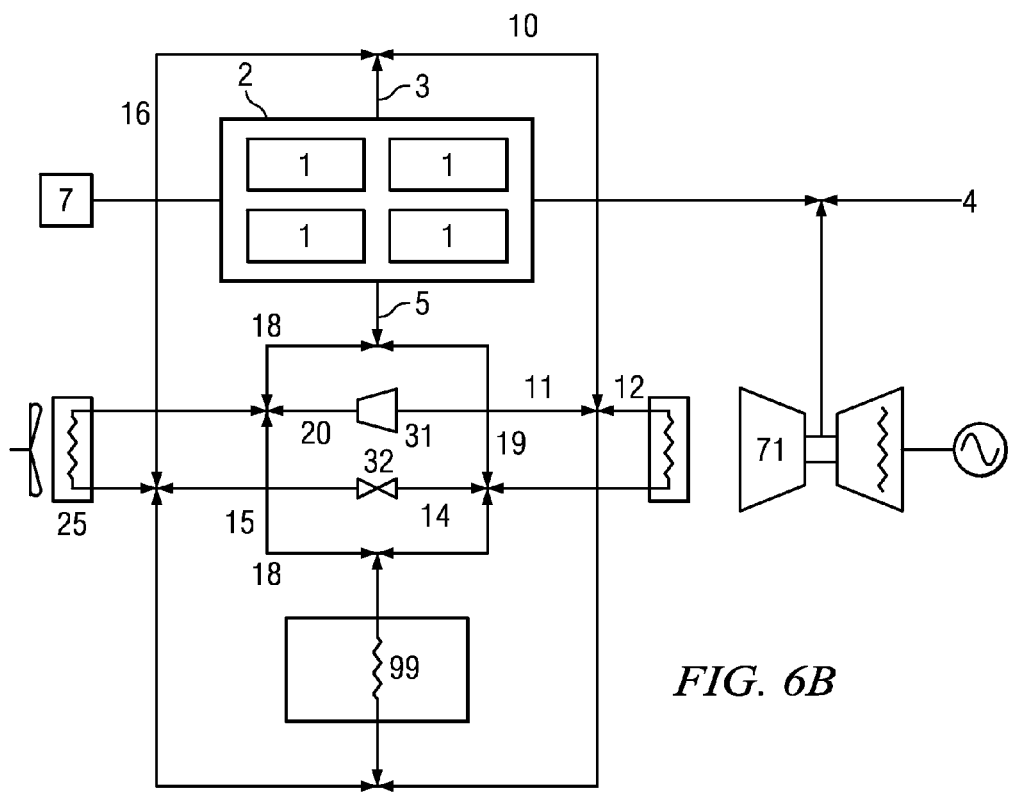
FIG. 6B is a diagram is a diagram of one embodiment of a clathrate hydrate unit array whereby gas can be supplied to a gas turbine by either transferring the latent heat of dissociation to a turbine inlet cooling coil or a thermal energy storage system for later use.

A more efficient and economic system would advantageously utilize the refrigeration system itself and the large amounts of cold energy stored in the hydrate. FIG. 5B illustrates a combined gas storage array and turbine inlet cooling system. One of the major operational drawbacks of gas turbines is that their power output is inversely proportional to the inlet air temperature. For this reason, many power plants that are located in regions prone to hot weather utilize turbine inlet air cooling (TIAC) systems. An extensive study of various TIAC systems determined that mechanical vapor refrigeration systems combined with thermal energy storage were the most efficient technology for the majority of gas turbine power plant applications. Interestingly, TIAC systems may suffer from the same major disadvantage as the gas clathrate hydrate storage system in FIG. 4, namely the inefficient utilization of the refrigeration system due to only the occasional need for turbine inlet cooling during high temperature periods. It is not unusual for a TIAC system to remain idle for more than 75% of the time. By integrating a gas clathrate hydrate storage array with a turbine inlet cooling system utilizing a common refrigeration system, the overall utilization rate of the refrigeration system can increase substantially.

The system can operate in a variety of modes depending on the prevailing market and temperature conditions, including: Turbine Inlet Cooling Mode, Gas Storage Mode, and Gas Dissociation Mode.

During warm weather or when increased power output is required the system can operate in Turbine Inlet Cooling Mode, wherein a refrigeration system comprised of a compressor 31, cooling tower 29, throttling valve 32, and evaporator 26 may be used to cool the inlet air C to the turbine 71.

When the prevailing natural gas price is low the system can operate in Gas Storage Mode, wherein the refrigeration system can be used to fill the gas clathrate hydrate storage array. This is achieved by passing the compressed refrigerant 20 through the air cooled condenser 29 and then throttling the pressurized refrigerant through throttling valve 32. The refrigerant is then passed through line 19 to the storage array 2 via line 5. The superheated vapor is then passed via line 10 back to the compressor.

When the prevailing natural gas price is high or when there is a pipeline interruption, the system can operate in Gas Release/Dissociation Mode, wherein gas can be withdrawn from the storage array 2 by using the clathrate hydrate storage array as the condenser of a heat pump and the turbine inlet cooling coils as a condenser. In this configuration the super heated fluid from the compressor 31 may be passed through the storage array 2 via lines 18 and 5. The superheated refrigerant heats and dissociates the hydrates within the storage array 2, thereby supplying gas to the turbine 71. Cold energy stored in the clathrate hydrates in the storage array is essentially transferred to (cooling) the refrigerant, which returns to the system via lines 16 and 15. The saturated refrigerant can then pass through throttling valve 32 and into the turbine cooling coil 26. Refrigerant may then return to the compressor via lines 12 and 11.

Typically TIAC is required during the summer months when both high temperatures and high electricity demand are encountered at the same time. Gas storage, on the other hand, is most often required during the winter months when gas demand is strong due to the need for residential and commercial heating. This fact allows the chillers in an integrated system to be used more efficiently. In the case where the gas must be dissociated and there is no need for turbine inlet cooling, heat can be extracted from the turbine exhaust in the form of steam or other heat transfer fluid to dissociate the hydrates within the tanks Gas and Thermal Energy Transfer There are a number of applications where it is advantageous to transfer the thermal energy and/or gas from one gas clathrate hydrate storage array to another. An example of this would be the transfer of gas and thermal energy from a clathrate hydrate ship to on-shore storage. The prior art either unloads the clathrate hydrates as a slurry or pellets (Mitsubishi, Mitsui) or dissociates the clathrate hydrates within the vessel itself (Gudmundson).

Figure 7:
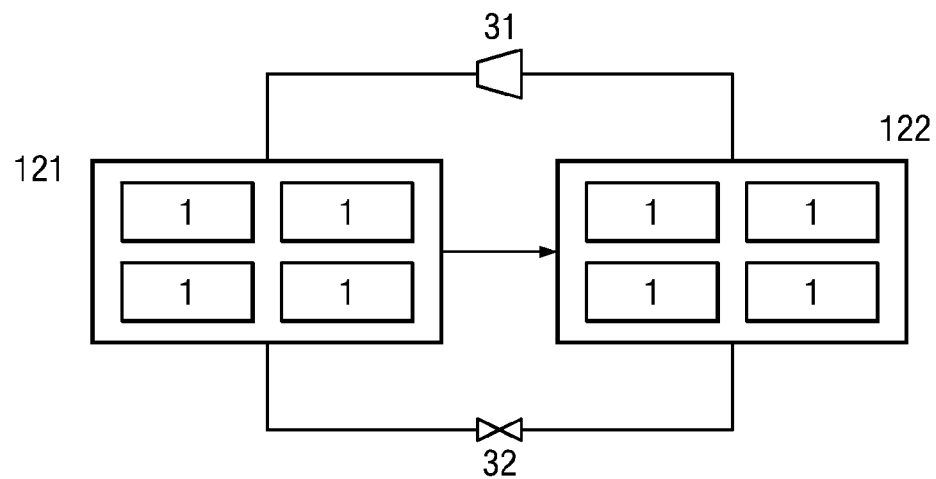
FIG. 7 is a diagram illustrating an embodiment of a gas and thermal energy transfer system whereby a single gas stream is produced by the dissociation of one clathrate hydrate array and subsequently stored in a second clathrate hydrate array by means of transferring the thermal energy from the first clathrate hydrate array to the second.

FIG. 7 illustrates the transfer of both gas and latent heat from a gas hydrate storage array 121 to another gas hydrate storage array 122. Latent thermal energy can be reused when the gas must be transferred. The mechanism by which thermal energy is reused shall be an interconnection between the heat transfer systems of the clathrate containing unit and the receiving unit such that the cold energy removed from the clathrate containing unit is maximally transferred to the receiving unit in which a new clathrate is formed with the gas dissociated from the clathrate containing unit.

In one embodiment of the present invention, the clathrate hydrates in array 121 have a higher formation temperature than those in 122. This may be achieved by the addition of various additives including surfactants, hydrotropes, or H-Hydrate promoters. The higher formation temperature in the array to be dissociated enables the use of smaller compressors and pumps.

Figure 8:
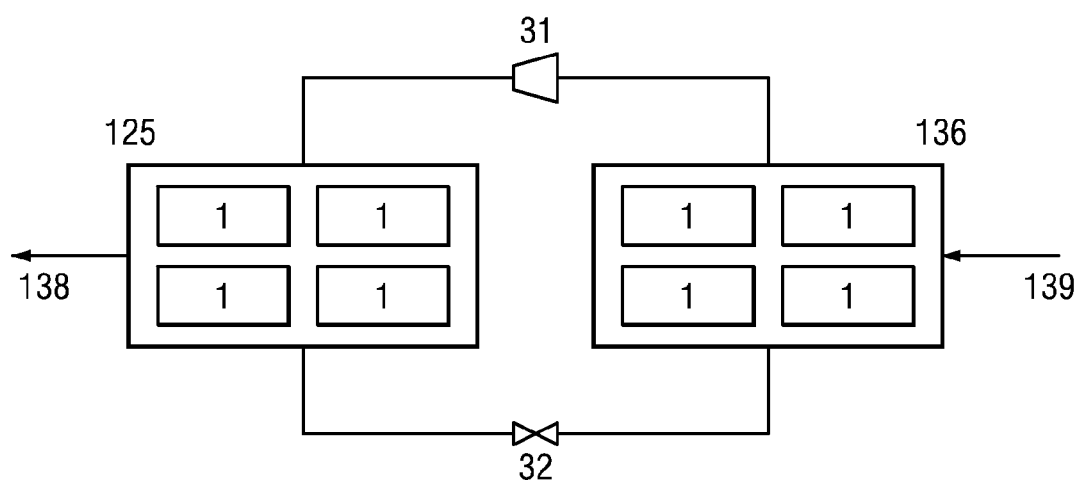
FIG. 8 is a diagram illustrating an embodiment of a gas and thermal energy transfer system whereby one gas stream is produced by the dissociation of one clathrate hydrate array and a second gas stream is stored in a second clathrate hydrate array by means of transferring the latent heat of the first array to the second array.

In certain applications it may be desirable to create one gas stream and simultaneously store a second gas stream. One such application is the production of natural gas for a combustion process and the simultaneous capture and storage of the resulting carbon dioxide. FIG. 8 illustrates the concurrent release of natural gas stream 138 from a first clathrate hydrate storage array 125 and the storage of a carbon dioxide gas stream 139 in a second clathrate hydrate storage array 136. The simultaneous dissociation of the natural gas clathrate within storage array 125 and formation of carbon dioxide clathrate in storage array 136 is achieved by creating a heat pump between the two arrays wherein the storage array 125 behaves as the condenser and storage array 136 behaves as the evaporator. The heat pump working fluid is passed through a compressor 31, cooled by the dissociation of natural gas clathrate within storage array 125, throttled through valve 32 and subsequently heated by the formation of carbon dioxide clathrate hydrate in storage array 136.

Integrated Gas Clathrate Hydrate Supply Chain

Figure 9:
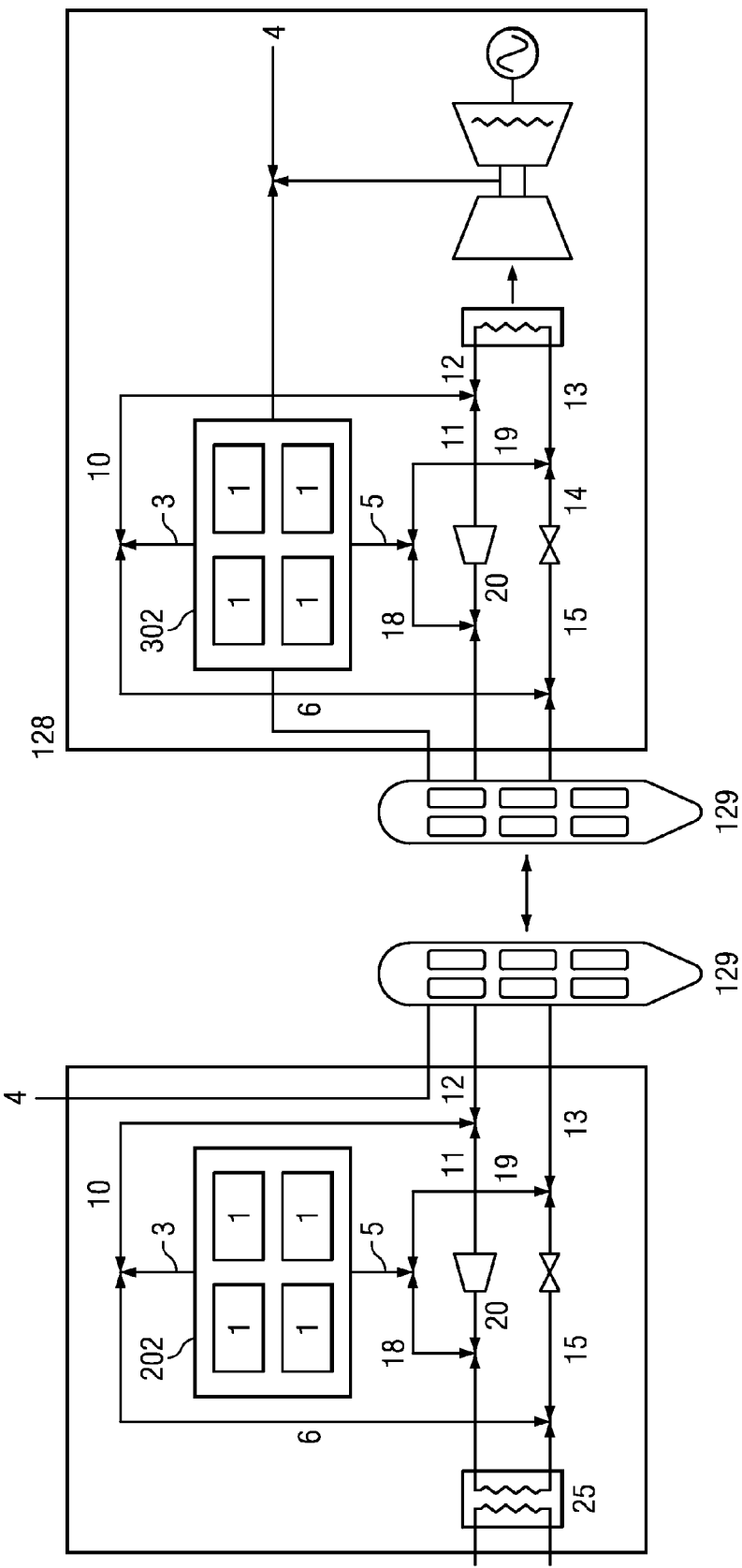
FIG. 9 is a diagram illustrating one embodiment of a marine gas hydrate transportation system with cold energy utilization for turbine inlet cooling and on-shore gas storage for peaking applications.

The continuous gas clathrate hydrate formation and transportation systems described in the prior art have a number of disadvantages. Chief among these is the inherent complexity of continuous clathrate hydrate production schemes that involve multistage processing and large numbers of moving parts. These attributes make such systems applicable to large scale on-shore applications where sufficient economies of scale can be achieved. The present invention enables smaller scale and, importantly, off-shore recovery and transportation of natural gas. In one implementation, the present invention would enable loading and shipment of gas from off-shore production zones to transportation vessels by means of an energy efficient clathrate formation process. Thermal energy created in formation of the clathrate can be reused when the gas must be transferred from storage on a barge to the ship or from the ship to a shore terminal. The mechanism by which thermal energy is preserved shall be an interconnection between the heat transfer systems of the clathrate containing unit and the receiving unit such that the cold energy removed from the clathrate containing unit is maximally transferred to the receiving unit in which a new clathrate is formed with the gas dissociated from the clathrate containing unit. FIG. 9 illustrates one embodiment of an integrated natural gas supply chain, utilizing clathrate hydrates, and including: a floating refrigeration, storage, production and offloading vessel (FRSPO) 126 comprising a water cooled refrigeration system 25, an onboard temporary clathrate hydrate storage array 202; a combined power plant and receiving terminal 128 consisting of a gas storage array 302, a turbine inlet cooling system 136, and a means of supplying excess or needed gas to the local gas distribution infrastructure 4; and a clathrate hydrate vessel containing a gas clathrate hydrate array 129

Accordingly, although the present invention has been described with reference to specific embodiments, various other embodiments are possible without departing from the scope of the present invention. Other embodiments of the present invention will be apparent to one of ordinary skill in the art. It is, therefore, intended that the present invention set forth herein not be limited to the embodiments described above.

What is claimed is:

1. A system facilitating thermal integration of clathrate hydrate formation and disassociation processes comprising:
   a clathrate hydrate formation and disassociation module comprising a heat exchanger including an inlet port and an outlet port operative to generate cold energy during disassociation of a clathrate hydrate;
   a cold energy consuming system comprising a turbine inlet cooling system, and means for transferring cold energy generated during disassociation of a clathrate hydrate from the clathrate hydrate formation and disassociation module to the cold energy consuming system.

2. The system of claim 1 further comprising means for transferring thermal energy generated by the cold-energy consuming system to the clathrate hydrate formation and disassociation module.

3. The system of claim 1 wherein the cold energy consuming system is a thermal energy storage system.

4. The system of claim 1 wherein the cold energy consuming system comprises cryogenic gas separation system.

5. The system of claim 1 wherein the cold energy consuming system comprises a desalination system.

6. A system facilitating thermal integration of two or more clathrate hydrate formation and disassociation processes, comprising
   a first clathrate hydrate formation and disassociation module comprising a heat exchanger including an inlet port and an outlet port;
   at least a second clathrate hydrate formation and disassociation module comprising a heat exchanger including an inlet port and an outlet port;
   a fluid circuit interconnecting the respective heat exchangers of the first and at least a second clathrate hydrate formation and disassociation module;
   a pump disposed in the fluid circuit to pump fluid through the fluid circuit;
   wherein the fluid is cooled as it passes through the heat exchanger of the first disassociation hydrate formation and disassociation module when operating in a disassociation mode;
   wherein the fluid, cooled from the first disassociation module, is heated as it passes through the heat exchanger of the second disassociation module when operating in a formation mode;
   wherein the first clathrate hydrate formation and disassociation module comprises a first container including an outlet port for releasing a gas during the disassociation mode; and wherein the second clathrate hydrate formation and disassociation module comprises a second container including an inlet port for injecting a gas during the formation mode; wherein the outlet port is connected to a gas consuming system; and
   wherein the inlet port is connected to a gas supplying system; wherein the gas consuming system is a gas combustion system; and wherein the gas supplying system is a gas combustion system.

7. The system of claim 6 wherein the first clathrate hydrate formation and disassociation module comprises a first container including an outlet port for releasing a gas during the disassociation mode; and wherein the second clathrate hydrate formation and disassociation module comprises a second container including an inlet port for injecting a gas during the formation mode; and a line connecting the outlet and inlet ports.

8. The system of claim 6, wherein the first module disassociates a first gas to be used in a combustion process of the gas combustion system; and wherein the second module forms clathrate hydrates of a second gas resulting from the combustion process.

9. The system of claim 8 wherein the first gas comprises a mixture containing methane.

10. The system of claim 8 wherein the second gas comprises a mixture where at least one component is carbon dioxide.

11. The system of claim 6 further comprising one or more manifolds interconnecting the first clathrate hydrate formation and disassociation module and the second clathrate hydrate formation and disassociation module.

12. An apparatus facilitating thermal integration of clathrate hydrate formation and disassociation processes with external systems, comprising
   a clathrate hydrate formation and disassociation module comprising a heat exchanger including an inlet port and an outlet port;
   a condenser;
   an evaporator;
   a compressor;

a plurality of fluid lines interconnecting the condenser, the evaporator, the compressor, and the heat exchanger of the clathrate hydrate formation and disassociation module; and one or more valves selectively configurable to divert flow among the fluid lines to create one or more fluid circuits including select ones of the condenser, the evaporator, the compressor, and the heat exchanger;

wherein, in a gas disassociation mode, the valves are configured to create a fluid circuit between the evaporator, the compressor, and the heat exchanger to allow refrigerant, heated by the evaporator to pass through the heat exchanger, and refrigerant, cooled by cold energy transfer resulting from the disassociation processes in the clathrate hydrate formation and disassociation module, to pass through the evaporator.

13. The system of claim 12 wherein, in a gas storage mode, the valves are configured to create a fluid circuit between the condenser, the heat exchanger and the compressor to provide refrigerant, cooled by the condenser, to pass through the heat exchanger.

14. The system of claim 12, wherein, in a cooling mode, the values are configured to create a fluid circuit including the condenser, the evaporator, the compressor.

15. The system of claim 12 further comprising
a second clathrate hydrate formation and disassociation module comprising a heat exchanger including an inlet port and an outlet port; and one or more manifolds interconnecting the clathrate hydrate formation and disassociation module and the second clathrate hydrate formation and disassociation module.

16. The system of claim 12 wherein the evaporator is an air-conditioning system.

17. An apparatus facilitating thermal integration of clathrate hydrate formation and disassociation processes with external systems, comprising a clathrate hydrate formation and disassociation module comprising a heat exchanger including an inlet port and an outlet port;

a condenser;

an evaporator;

a compressor;

a plurality of fluid lines interconnecting the condenser, the evaporator, the compressor, and the heat exchanger of the clathrate hydrate formation and disassociation module; and one or more valves selectively configurable to divert flow among the fluid lines to create one or more fluid circuits including select ones of the condenser, the evaporator, the compressor, and the heat exchanger; wherein the condenser, the evaporator, the compressor, and at least some of the plurality of fluid lines are part of a turbine inlet cooling system.

* * * * *